US012402234B2

(12) United States Patent
DeCiccio et al.

(10) Patent No.: US 12,402,234 B2
(45) Date of Patent: *Aug. 26, 2025

(54) MODULAR LASER-PRODUCED PLASMA X-ray SYSTEM

(71) Applicant: Research Instruments Corporation, Providence, RI (US)

(72) Inventors: Daniel John DeCiccio, Winter Park, FL (US); Christoph Rose-Petruck, Barrington, RI (US)

(73) Assignee: Research Instruments Corporation, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,383

(22) Filed: Feb. 9, 2024

(65) Prior Publication Data

US 2024/0188206 A1 Jun. 6, 2024

Related U.S. Application Data

(63) Continuation of application No. 17/732,196, filed on Apr. 28, 2022, now Pat. No. 11,930,581, which is a continuation of application No. 15/855,642, filed on Dec. 27, 2017, now Pat. No. 11,324,103.

(60) Provisional application No. 62/439,341, filed on Dec. 27, 2016.

(51) Int. Cl.
*H05G 2/00* (2006.01)
*H01J 35/06* (2006.01)

(52) U.S. Cl.
CPC ......... *H05G 2/0086* (2024.08); *H01J 35/065* (2013.01); *H05G 2/0094* (2024.08); *H01J 2235/082* (2013.01)

(58) Field of Classification Search
CPC ....... H05G 2/008; H05G 2/005; H01J 35/065; H01J 2235/082
See application file for complete search history.

(56) References Cited

U.S. PATENT DOCUMENTS

| | | | | |
|---|---|---|---|---|
| 9,476,841 | B1 | 10/2016 | Antsiferov et al. | |
| 11,324,103 | B2 * | 5/2022 | DeCiccio | H01J 35/065 |
| 11,330,697 | B2 | 5/2022 | Rose-Petruck | |
| 2004/0156475 | A1 | 8/2004 | Hatanaka et al. | |
| 2011/0317818 | A1 | 12/2011 | Hertz et al. | |
| 2018/0206318 | A1 | 7/2018 | Deciccio et al. | |
| 2018/0206319 | A1 | 7/2018 | Rose-Petruck | |
| 2018/0206320 | A1 | 7/2018 | Rose-Petruck | |

* cited by examiner

*Primary Examiner* — Courtney D Thomas
(74) *Attorney, Agent, or Firm* — Hinckley, Allen & Snyder, LLP; David R. Josephs

(57) ABSTRACT

A modular laser-produced plasma X-ray system includes a liquid metal flow system enclosed within a low-pressure chamber, the flow system including a liquid metal, wherein in at least one location on the liquid metal forms a metal target directly illuminated by laser pulses, a circulation pump within the liquid metal flow system for circulating the liquid metal, a laser pulse emitter configured to transmit laser pulses into the chamber via a laser window, focusing optics, located between the emitter and the metal target, the focusing optics directing the laser pulses to strike the metal target at a target location to form X-ray pulses, and an X-ray window positioned within the chamber to enable the X-ray pulses to exit the chamber.

21 Claims, 3 Drawing Sheets

MODULAR LASER-PRODUCED PLASMA X-ray SYSTEM

CROSS REFERENCE TO RELATED APPLICATIONS

This application is a continuation application of U.S. patent application Ser. No. 17/732,196 filed Apr. 28, 2022, which is a continuation application of U.S. patent application Ser. No. 15/855,642 filed Dec. 27, 2017, now U.S. Pat. No. 11,324,103, which claims benefit from U.S. Provisional Patent Application Ser. No. 62/439,341 filed Dec. 27, 2016, the entire contents of which are incorporated herein by reference.

BACKGROUND OF THE INVENTION

The present patent document relates to X-ray instruments, and more specifically to a modular laser-produced plasma x-ray system.

Table-top X-ray instruments such as X-ray microscopes require high-brilliance X-ray sources. The brilliance of a conventional X-ray tube is limited by the maximum power density that the anode can withstand without melting. Currently, most instruments use X-ray tubes with fixed or rotating anodes. An electron beam is focused onto the anode where it decelerates rapidly and emits continuum and line (fluorescence) X-rays. Radiation is emitted at a large solid angle, a characteristic that is not well-suited for X-ray microscopy because it necessitates condenser optics that capture and reflect as much radiation as possible onto the sample. The magnification optics (Fresnel zone plate) is chromatic and properly magnifies the sample onto the image detector only for a specific X-ray wavelength. Therefore, there is a critical need for a narrow-bandwidth emission from the source to maximize the monochromatic X-ray flux on the sample.

Rotating the anode distributes the energy over a larger area and permits the use of higher power electron beams without damaging the anode. However, although the emitted X-ray flux can be increased, generating higher electron beam power requires increasing the electron emitting area of the cathode in the electron gun. As a result, the electron beam cannot be focused to a tight spot on the anode and the maximum achievable brilliance is lower than required for X-ray microscopy. With a brilliance of about $10^{11}$ ph/(s $mm^2$ $mrad^2$ 0.1% BW), X-ray generation with electrostatically accelerated electron beams is a mature technology that appears to have reached a performance limit that cannot be significantly increased.

At times, solid target sources are used. However solid target sources often require periodic replacement. Fine metal powder debris accumulates inside the vacuum chamber and must be cleaned regularly, which renders these sources high maintenance.

Further, traditional X-ray systems are often large, immobile, and difficult to take apart for maintenance or repairs.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus for a modular laser-produced plasma x-ray system.

In one aspect, the invention features a modular laser-produced plasma X-ray system including a liquid metal flow system enclosed within a low-pressure chamber, the flow system including a liquid metal, wherein in at least one location on the liquid metal forms a metal target, a circulation pump within the liquid metal flow system for circulating the liquid metal, a laser pulse emitter configured to transmit laser pulses into the chamber via a laser window, focusing optics, located between the emitter and the metal target, the focusing optics directing the laser pulses to strike the metal target at a target location to form X-ray pulses, and an X-ray window positioned within the chamber to enable the X-ray pulses to exit the chamber, wherein the laser pulses prevent debris from accumulating on the laser window, and the laser pulses reflect off the target surface onto the X-ray window and prevent debris from accumulating on the X-ray window.

In another aspect, the invention features a modular laser-produced plasma X-ray system including a liquid metal flow system enclosed within a vacuum chamber, the flow system including a liquid metal, wherein in at least one location on the liquid metal forms a metal target, a circulation pump within the liquid metal flow system for circulating the liquid metal, a laser pulse emitter configured to transmit laser pulses into the vacuum chamber via a thin laser window, focusing optics, located between the emitter and the metal target, the focusing optics directing the laser pulses to strike the metal target at a target location to form X-ray pulses, and an X-ray window positioned within the vacuum chamber to enable the X-ray pulses to exit the vacuum chamber, wherein the laser pulses prevent debris from accumulating on the thin laser window, and the laser pulses reflect off the target surface onto the X-ray window and prevent debris from accumulating on the X-ray window.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
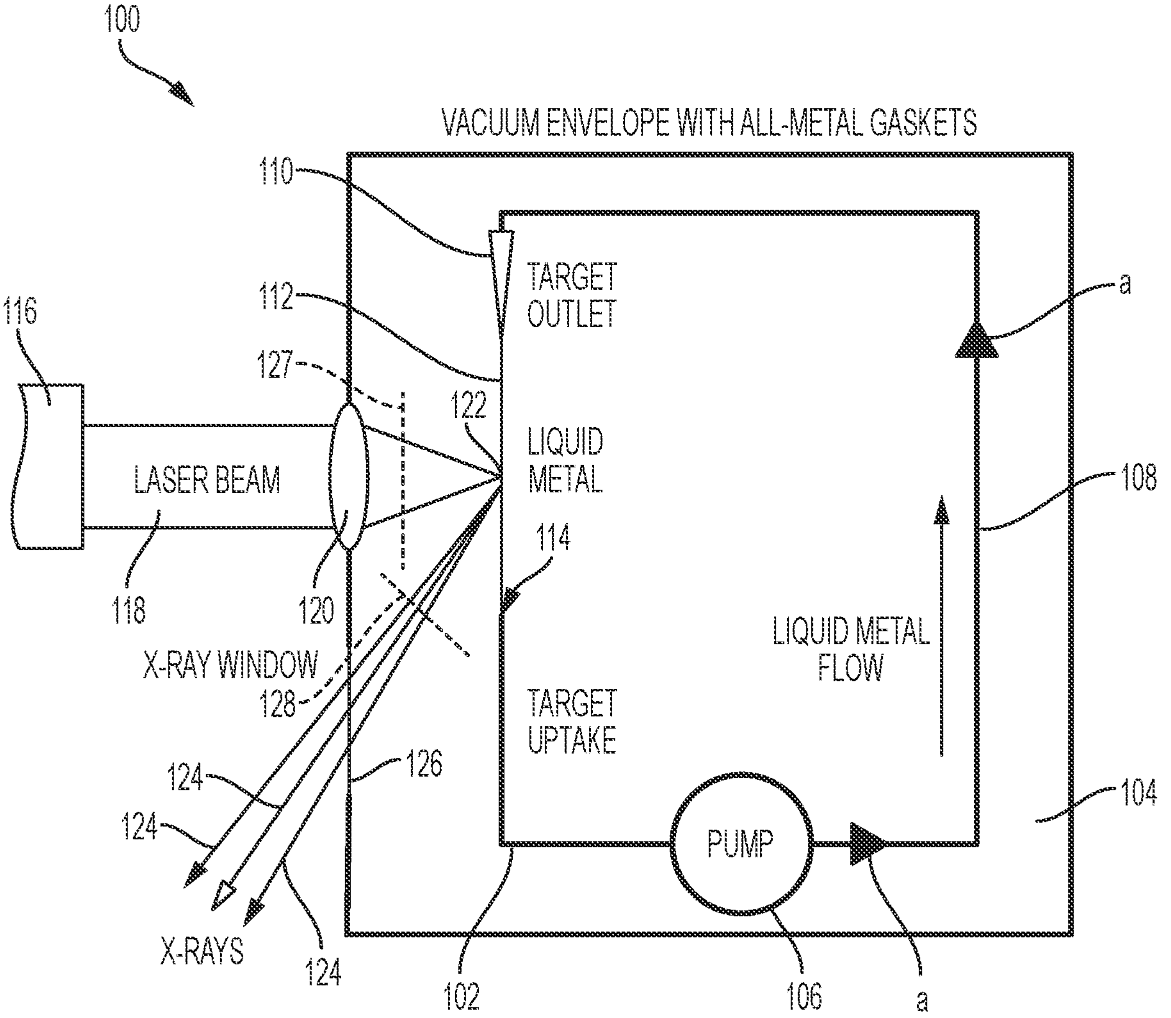
FIG. 1 is a schematic view of an exemplary laser-produced plasma X-ray system ("LPX system").

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The subject technology includes a modular laser-produced plasma X-ray system. The X-ray system has a liquid metal flow system enclosed within a low-pressure, or vacuum chamber. A circulation pump within the flow system circulates a liquid metal. In at least one location, the liquid metal forms a metal target. A laser pulse emitter is configured to transmit laser pulses into the chamber via a laser window. Focusing optics, located between the emitter and the metal target, direct the laser pulses to strike the metal target at a target location to form X-ray pulses. An X-ray window is positioned within the chamber to allow the X-ray pulses to exit the chamber. The laser pulses are of a high power such that they prevent debris from accumulating on the laser window. Additionally, the laser pulses are at a high enough power such that the laser pulses reflect off the target surface and onto the X-ray window to prevent debris from accumulating on the X-ray window. In this way, any debris which accumulates on the laser window or X-ray window can be removed through evaporation, ablation, or related processes.

In at least some embodiments, the laser window is thin enough to allow the laser pulses to pass through without significantly defocusing the laser pulses. Alternatively, or additionally, the target is shaped to maximize the trapping of the laser light.

In at least some embodiments, the vacuum chamber is formed from materials including one or more of the following: tantalum; tungsten alloys; tantalum-coated materials; tungsten-coated materials; and ceramic materials.

In some embodiments, the X-ray system includes a base unit capable of providing power to the system and creating a communication network between the system and external devices. The X-ray system can also include a control unit configured to operate the X-ray system.

The base unit can also include component connection vehicles configured to removably attach one or more of the following components to the base unit: the chamber, the circulation pump, control electronics, the emitter, the laser window, the focusing optics, the liquid metal flow system, and the X-ray window. In some embodiments, one or more of the connection vehicles are kinematic mounts, capable of aligning the emitter, the laser window, the focusing optics, the liquid metal, and the X-ray window such that the laser pulses from the emitter are released from the chamber as X-rays.

In FIG. 1, a schematic view of an exemplary laser-produced plasma X-ray system in accordance with the subject disclosure is shown generally at 100. Within the system 100, a liquid metal flow system 102 within a vacuum chamber 104 includes a pump 106 which quickly circulates a liquid metal 108. The vacuum chamber 104 is sealed in a vacuum tight manner by a number of metal gaskets (not shown). The liquid metal 108 is formed from a solid-density liquid material and travels through the flow system 102 as shown by flow arrows "a." The flow system 102 includes a target liquid outlet 110 which projects a liquid metal target 112 between the outlet 110 and an opening 114 that accepts the target liquid. The target is not necessarily a free-flowing target beam.

An emitter 116 transmits ultrafast, high-intensity laser pulses 118 into the chamber 104 through a laser window 120 that is vacuum-sealed to the vacuum chamber 104. Focusing optics (not shown) focus the laser pulses 118 onto the target 112 generating plasma around a target location 122. In the plasma, electrons are heated to high temperature and accelerated to high kinetic energies, such as hundreds of keV. These electrons penetrate the metal target 112 where they create continuum and line X-rays 124 that are emitted out of the vacuum chamber 106 through an X-ray window 126. While the embodiment shown uses only one X-ray window 126, multiple X-ray windows 126 could also be used to allow X-rays 124 to exit the chamber 104 at different angles. The X-ray window 126 is sealed to the chamber 104 to preserve the vacuum. In some embodiment the laser light transmits through a debris shield 127 and the X-ray pulses transmit though a debris shield 128.

Laser pulses 118 of suitable energy and pulse length produce very high power densities within a microscopic spot around the target location 122 on the target 112. Since the electrons never travel more than a few micrometers from the target location 122, the area emitting X-rays 124 is very narrow. For example, in some embodiments, the diameter of the area emitting X-rays 124 is about 10 μm. Hence, both electron acceleration and X-ray generation occur within a microscopic volume on the surface of the target 112, around the target location 122.

Each laser shot 118 striking the target 112 damages the surface of the target 112. The damaged surface of the target 112 must then be moved out of the focus of the emitter 116 so that the next laser pulse 118 can interact with a fresh, well-positioned target 112 surface. This is accomplished by ensuring that the target 112 has a high enough flow rate that the surface of the target 112 is replaced before the next laser pulse 118 arrives. By cycling the target 112 continuously, the target 112 is recycled indefinitely, resulting in maintenance-free operation of the liquid metal target 112.

Further, in at least some embodiments, various features of the system 100 further reduce maintenance and cleaning needs and costs. For example, a target 112 that is completely in liquid form, or nearly completely in liquid form, can help reduce maintenance needs. Any debris expelled from a liquid target 112 will also be in liquid form and can be quickly recycled back into the liquid metal flow system 102. Further, debris tends to accumulate on the laser window 120 and the X-ray output window 126. Therefore, additionally, or alternatively, in some embodiments the laser power of the emitter 116 is high enough to remove any target-debris from the laser window 120, for instance, by evaporation, ablation, or related processes. Similarly, in some embodiments, the power of the laser 118, after being reflected off the target 112, is strong enough to remove debris from the X-ray output window 126 by evaporation, ablation, or related processes. Therefore using an emitter with a high enough laser power can reduce or eliminate the need to clean the laser window 120 and/or the X-ray window 126.

Figure 2:
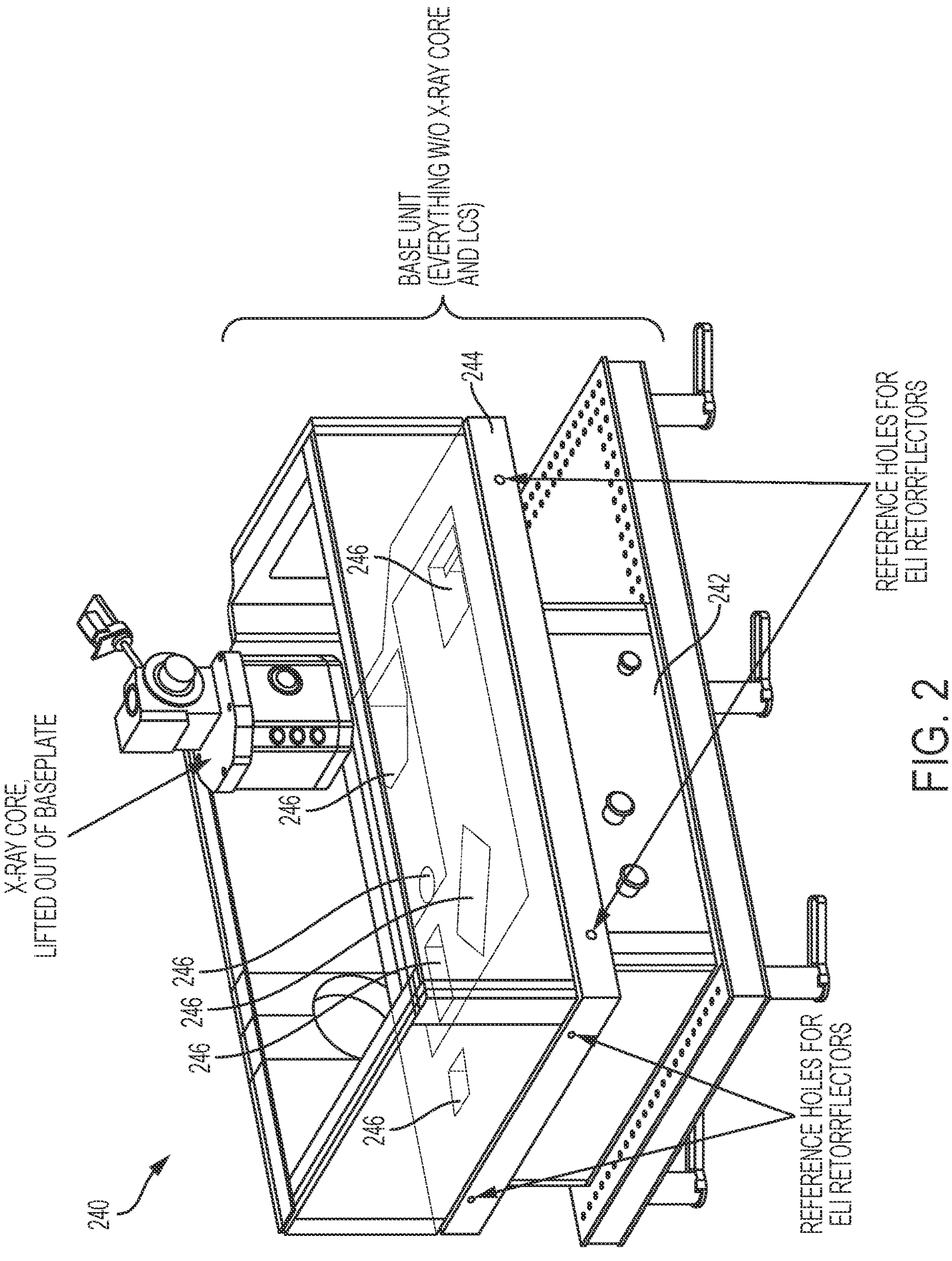
FIG. 2 is a perspective view of the base unit for the exemplary LPX system of FIG. 1.

In FIG. 2, a base unit 240 for an LPX system in accordance with the subject technology is shown. It should be noted that various components of the LPX system 100 are omitted for the sake of better explaining the base unit 240, however, the base unit 240 is operable in conjunction with at least all components of the LPX system 100 described above. The base unit 240 includes an electronics cabinet 242 which has a power source and an electronics networking system (both within the cabinet 242, but not shown distinctly). The power source can be any type of power source, such as a battery. The base unit 240 electrically connects the power source to the other components of the LPX system 100. The base unit 240 also includes an electronics networking system, such as a computer with Wi-Fi capability, which allows communication between the base unit, and the components attached thereto, and external devices (not shown). External devices can include any outside device that a user desires to send or receive information or instructions to or from the base unit, for example, other computer systems, a Wi-Fi network, or a router. A control unit (not shown) also connects to the base unit 240, either physically or via a networking system, as described above, and is configured to operate the various components attached to the base unit 240 and/or the LPX system 100.

The base unit 240 includes a foundation 244 which defines component connection vehicles 246. The component connection vehicles 246 allow for removable attachment of the various components of the LPX system 100. For example, in the embodiment shown, at least some of the component connection vehicles are configured to removably attach the chamber 104, the circulation pump 106, and control electronics (not shown). In other embodiments, the connection vehicles 246 also allow for removable attachment of the emitter 116, the laser window 120, the focusing optics, the liquid metal flow system 102, and the X-ray window 126. At least some of the connection vehicles 246 can also be configured as kinematic mounts. Configuring the connection vehicles 246 for the emitter 116, the laser window 120, the focusing optics, the flow system 102, and the X-ray window 126 as kinematic mounts results in the LPX system 100 being realized when the aforementioned components are attached to the base unit 240. For example, when said components are attached to the base unit 240, the system 100 reflects laser pulses 118 off a liquid metal target 112 to generate X-rays 124, as described with respect to FIG. 1. Since the connection vehicles 246 allow for removable attachment of the components, the components can be removed or exchanged, for example for maintenance, while the base unit 240 stays in place.

Figure 3:
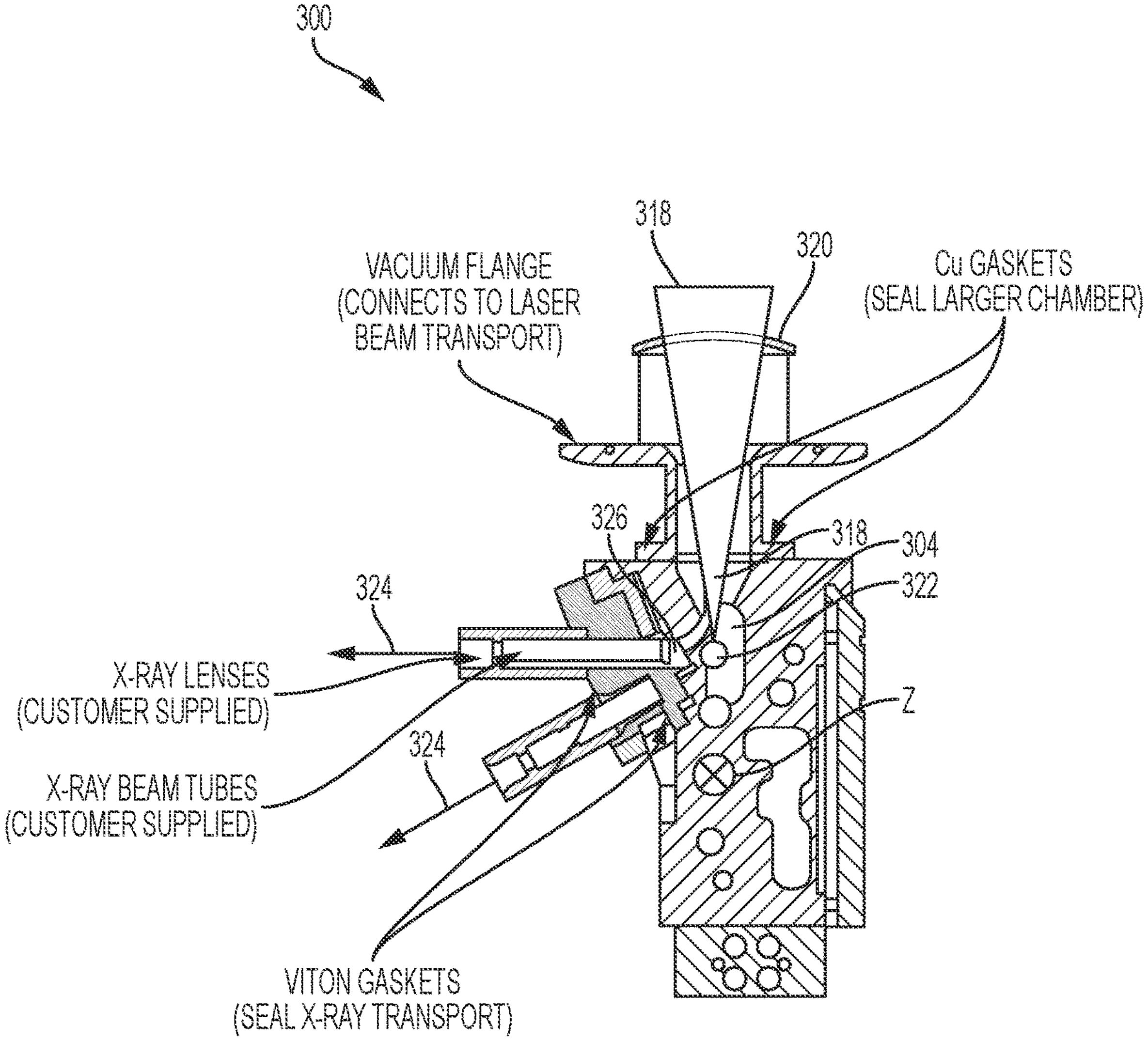
FIG. 3 is a cross section of the exemplary LPX system.

In FIG. 3, a cross section of an LPX system in accordance with the subject technology is shown generally at 300. A liquid metal target (not shown in detail) flows along a path parallel to axis "z" within a vacuum chamber 304. Laser pulses 318 penetrate the vacuum chamber 304 via a vacuum sealed laser window 320. The laser pulses 318 are focused by focusing optics (not shown) into a narrow point where the laser pulses 318 strike a target location 322 on a liquid metal target. X-rays 324 are then transmitted out of the LPX system 300 via an X-ray window 326. As discussed above, the high power of the laser pulses 318 keep debris from accumulating on the laser window 320 or the X-ray window 326, for example, by causing debris to evaporate. This allows the LPX system 300 to operate effectively and efficiently without the need for maintenance and/or cleaning.

The vacuum chambers shown above can be created, and vacuum sealed, by various methods known in the art. In one embodiment, the vacuum chamber is constructed from tantalum or tungsten alloys or other tantalum-coated or tungsten-coated materials. In another embodiment, the vacuum chamber is constructed from a ceramic material.

The other components of the LPX system can be formed from typical materials associated with X-ray instruments, solid-density target mediums, and laser beams, as are known to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A modular laser-produced plasma X-ray system comprising:

a liquid metal flow system enclosed within a low-pressure chamber, the flow system including a liquid metal, wherein in at least one location on the liquid metal forms a metal target directly illuminated by laser pulses;

a circulation pump within the liquid metal flow system for circulating the liquid metal;

a laser pulse emitter configured to transmit laser pulses into the chamber via a laser window;

focusing optics, located between the emitter and the metal target, the focusing optics directing the laser pulses to strike the metal target at a target location to form X-ray pulses; and an X-ray window positioned within the chamber to enable the X-ray pulses to exit the chamber, wherein:

the laser pulses prevent debris from accumulating on the laser window or a debris shield inserted between the laser window and the target and the laser pulses reflect off the target surface onto the X-ray window and prevent debris from accumulating on the X-ray window of a debris shield inserted between the target and the X-ray window.

2. The modular laser-produced plasma X-ray system of claim 1 wherein the low-pressure chamber is a vacuum chamber.

3. The modular laser-produced plasma X-ray system of claim 1 wherein the laser window is thin to enable the laser pulses to pass through without significantly defocusing the laser pulses.

4. The modular laser-produced plasma X-ray system of claim 1 wherein the target is shaped to maximize optical trapping of the laser pulses.

5. The modular laser-produced plasma X-ray system of claim 1 wherein one or several debris shields are heated in order to evaporate condensed debris without any assistance form the laser light.

6. The modular laser-produced plasma X-ray system of claim 1 wherein one or several debris shields are heated in order to evaporate condensed debris with assistance from the laser light.

7. The modular laser-produced plasma X-ray system of claim 1 wherein the target is not presented as a free-flowing liquid metal jet but in the form of a flow attached to a substrate or flow-guide such as a mesh, wire-guide, or as a supported droplet.

8. The modular laser-produced plasma X-ray system of claim 7 wherein the target is presented as a liquid metal surface under the influence of a centrifugal force, for instance produced in a spinning cup or a liquid flow along a curved surface.

9. The modular laser-produced plasma X-ray system of claim 7 wherein the target may flow as a free jet for some distance but the interaction of the laser beam with the target fluid is NOT with the free-flowing jet but with the liquid target after it has contacted a substrate surface, such as a wall, mesh, or guide wire.

10. The modular laser-produced plasma X-ray system of claim 1 wherein the vacuum chamber is formed from materials including one or more of the following:

tantalum, tungsten alloys, tantalum-coated materials, tungsten-coated materials and ceramic materials.

11. The modular laser-produced plasma X-ray system of claim 1 further comprising:

a base unit, the base unit capable of providing power to the system and creating a communication network between the system and external devices; and a control unit configured to operate the X-ray system.

12. The modular laser-produced plasma X-ray system of claim 11 wherein the base unit includes component connection vehicles, the component connection vehicles configured to removably attach one or more of the following components to the base unit: the chamber, the circulation pump, and control electronics.

13. The modular laser-produced plasma X-ray system of claim 12 wherein the base unit further includes component connection vehicles configured to removably attach one or more of the following components to the base unit: the emitter, the laser window, the focusing optics, the liquid metal flow system, and the X-ray window.

14. The modular laser-produced plasma X-ray system of claim 13 wherein one or more of the connection vehicles are kinematic mounts, capable of aligning the emitter, the laser window, the focusing optics, the liquid metal, and the X-ray window such that the laser pulses from the emitter are released from the chamber as X-rays.

15. A modular laser-produced plasma X-ray system comprising:

a liquid metal flow system enclosed within a vacuum chamber, the flow system including a liquid metal, wherein in at least one location on the liquid metal forms a metal target;

a circulation pump within the liquid metal flow system for circulating the liquid metal;

a laser pulse emitter configured to transmit laser pulses into the vacuum chamber via a thin laser window;

focusing optics, located between the emitter and the metal target, the focusing optics directing the laser pulses to strike the metal target at a target location to form X-ray pulses; and an X-ray window positioned within the vacuum chamber to enable the X-ray pulses to exit the vacuum chamber, wherein:

the laser pulses prevent debris from accumulating on the thin laser window; and the laser pulses reflect off the target surface onto the X-ray window and prevent debris from accumulating on the X-ray window.

16. The modular laser-produced plasma X-ray system of claim 15 wherein the target is shaped to maximize a trapping of the laser pulses.

17. The modular laser-produced plasma X-ray system of claim 15 wherein the vacuum chamber is formed from materials including one or more of the following: tantalum, tungsten alloys, tantalum-coated materials, tungsten-coated materials and ceramic materials.

18. The modular laser-produced plasma X-ray system of claim 15 further comprising:

a base unit, the base unit capable of providing power to the system and creating a communication network between the system and external devices; and a control unit configured to operate the X-ray system.

19. The modular laser-produced plasma X-ray system of claim 18 wherein the base unit includes component connection vehicles, the component connection vehicles configured to removably attach one or more of the following components to the base unit: the chamber, the circulation pump, and control electronics.

20. The modular laser-produced plasma X-ray system of claim 19 wherein the base unit further includes component connection vehicles configured to removably attach one or more of the following components to the base unit: the emitter, the laser window, the focusing optics, the liquid metal flow system, and the X-ray window.

21. The modular laser-produced plasma X-ray system of claim 20 wherein one or more of the connection vehicles are kinematic mounts, capable of aligning the emitter, the laser window, the focusing optics, the liquid metal, and the X-ray window such that the laser pulses from the emitter are released from the chamber as X-rays.

* * * * *